GOODMAN & ROTE.
Seed-Planter.
No. {114, 31,118.}  Patented Jan. 15, 1861.
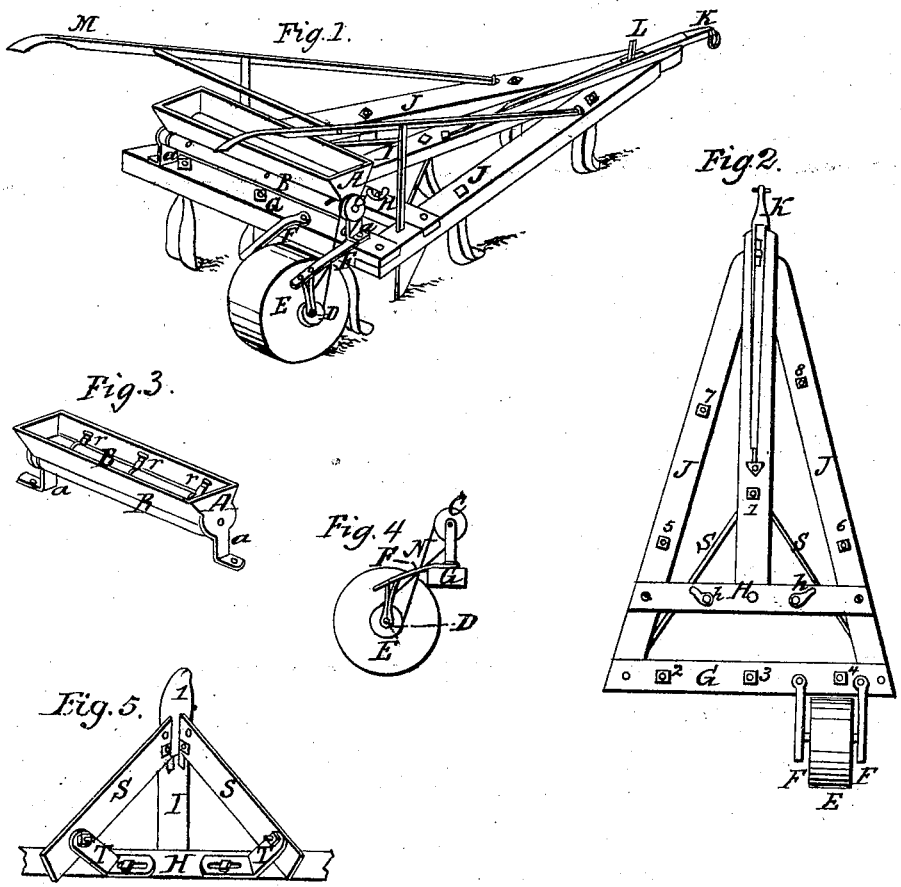

UNITED STATES PATENT OFFICE.

J. GOODMAN AND SAML. ROTE, OF LANCASTER, PENNSYLVANIA.

IMPROVEMENT IN SEEDING-CULTIVATORS.

Specification forming part of Letters Patent No. 31,118, dated January 15, 1861.

*To all whom it may concern:*

Be it known that we, JOHN GOODMAN and SAMUEL ROTE, of the city and county of Lancaster, in the State of Pennsylvania, have invented new and useful Improvements on Cultivators, forming a Combined Seeder and Cultivator; and we do hereby declare that the following is a full, clear, and exact description of the construction and operation of the same, reference being had to the accompanying drawings, making a part of this specification, in which—

Figure 1 is a perspective view of the implement with all its parts in place. Fig. 2 shows the plan of the frame-work, &c., seen vertically, the hopper and roller being removed and illustrated separately by Fig. 3, showing its several parts in perspective. Fig. 4 is a side view of the driving-wheel and strap-pulleys, by which motion is imparted to the seed-roller. Fig. 5 shows the slotted supports of the scrapers attached to the under side of the machine.

The frame-work presents no novelty, though peculiarly adapted to the application of the several improvements, such as the scraping-blades *s*, made adjustab'e in a twofold manner. By means of a series of holes for the screw-bolts the blades may be raised and lowered, and by means of the slotted supports T their angles are lessened or increased. The headed bolts entering the slots of T pass through the cross-piece H to the top of the machine, where handled bars *h* are affixed, so that the scrapers *s* are easily removed or put in place. The bearings F for the traction-wheel E in the rear of the machine, as well as the supports of the hopper A, with its seed-roller B, are also fastened with screw-bolts, so that the several improvements can be applied to an ordinary shovel-harrow. The seed-roller, partly within and under the hopper, has a series of hollows for the lodgment of the seeds in a line over each of the three rear shovels. There are also brushes *r* on the rear inside of the hopper in a line with the hollows in the roller, to aid in the proper discharge of the seed contained within the covered hopper. The roller B has a strap-pulley, *c*, connected by a strap or cord with the pulley D on the axle of the wheel F, by which the roller is made to revolve. Thus the plain or ordinary shovel plow or harrow is converted into a combined seeder and cultivator, embracing in one machine the advantages of three distinct implements. The object of this combination is to enable farmers to perform three necessary operations in one—namely, to dress and finish corn by the additional application of the scrapers *s*, bringing the surface soil close up to the rows and removing all weeds between them, at the same time depositing in a regular manner the seeds of turnips, rutabaga, or other kinds desired to be sown or planted between the corn rows, evidently at a great saving of time and expense, and altogether forming a highly desirable combination.

We are aware that there is no novelty in the cultivator, scrapers, nor seeding apparatus, separately considered; nor do we claim such.

What we claim as our invention, and desire to secure by Letters Patent, is—

The combination and arrangement of the doubly-adjustable scrapers *s*, with their slotted supports T, and the seeding-roller B, hopper A, and appliances, when made and operated substantially as herein specified, for the purpose mentioned.

JOHN GOODMAN.
SAMUEL ROTE.

Witnesses:
S. G. MUSSER,
JACOB STAUFFER.